(12) United States Patent
Fujii

(10) Patent No.: US 6,416,128 B1
(45) Date of Patent: Jul. 9, 2002

(54) VEHICLE SEAT

(75) Inventor: Yukinori Fujii, Shioya-gun (JP)

(73) Assignee: TS Tech Co., Ltd., Saitama (JP)

( * ) Notice: Subject to any disclaimer, the term of this patent is extended or adjusted under 35 U.S.C. 154(b) by 93 days.

(21) Appl. No.: 09/699,511

(22) Filed: Oct. 31, 2000

(30) Foreign Application Priority Data

May 31, 2000 (JP) ........................................ 2000-163059

(51) Int. Cl.$^7$ ................................................ B60N 2/58
(52) U.S. Cl. ............................ 297/218.1; 297/219.1; 297/253
(58) Field of Search ......................... 297/218.1, 218.2, 297/218.3, 219.1, 228.13, 229, 250.1, 253; 24/30.55, 66.2, 662

(56) References Cited

U.S. PATENT DOCUMENTS

| | | | |
|---|---|---|---|
| 5,918,934 A | * 7/1999 | Siegrist | 297/250.1 |
| 5,941,601 A | 8/1999 | Scott et al. | |
| 6,322,141 B1 | * 11/2001 | Dutkievic et al. | 297/253 |

FOREIGN PATENT DOCUMENTS

FR 2472923 * 7/1981 ............ 297/219.1

* cited by examiner

Primary Examiner—Peter R. Brown
(74) Attorney, Agent, or Firm—Oliff & Berridge, PLC

(57) ABSTRACT

A vehicle seat has a seat, an ISO FIX bar for securing a child seat to the seat, and a covering member for covering the seat. The covering member has a slit portion for the ISO FIX bar to be exposed to a vehicle room, and has an extending portion extending from one side of the slit portion. The vehicle seat also has an elastic board. The elastic board has a flat shape and an inserting portion to be inserted in a spacing of the ISO FIX bar. The elastic board is attached to a backside of a periphery of the slit portion of the covering member. The extending portion of the covering member is attached on an upper surface of the inserting portion of the elastic board, wherein the upper surface faces a side of the vehicle room. The inserting portion of the elastic board is inserted in the spacing of the ISO FIX bar, so that the ISO FIX bar is positioned at the slit portion of the covering member.

5 Claims, 13 Drawing Sheets

52   51   52

31   312   312
311

322   321   322
32
323   323

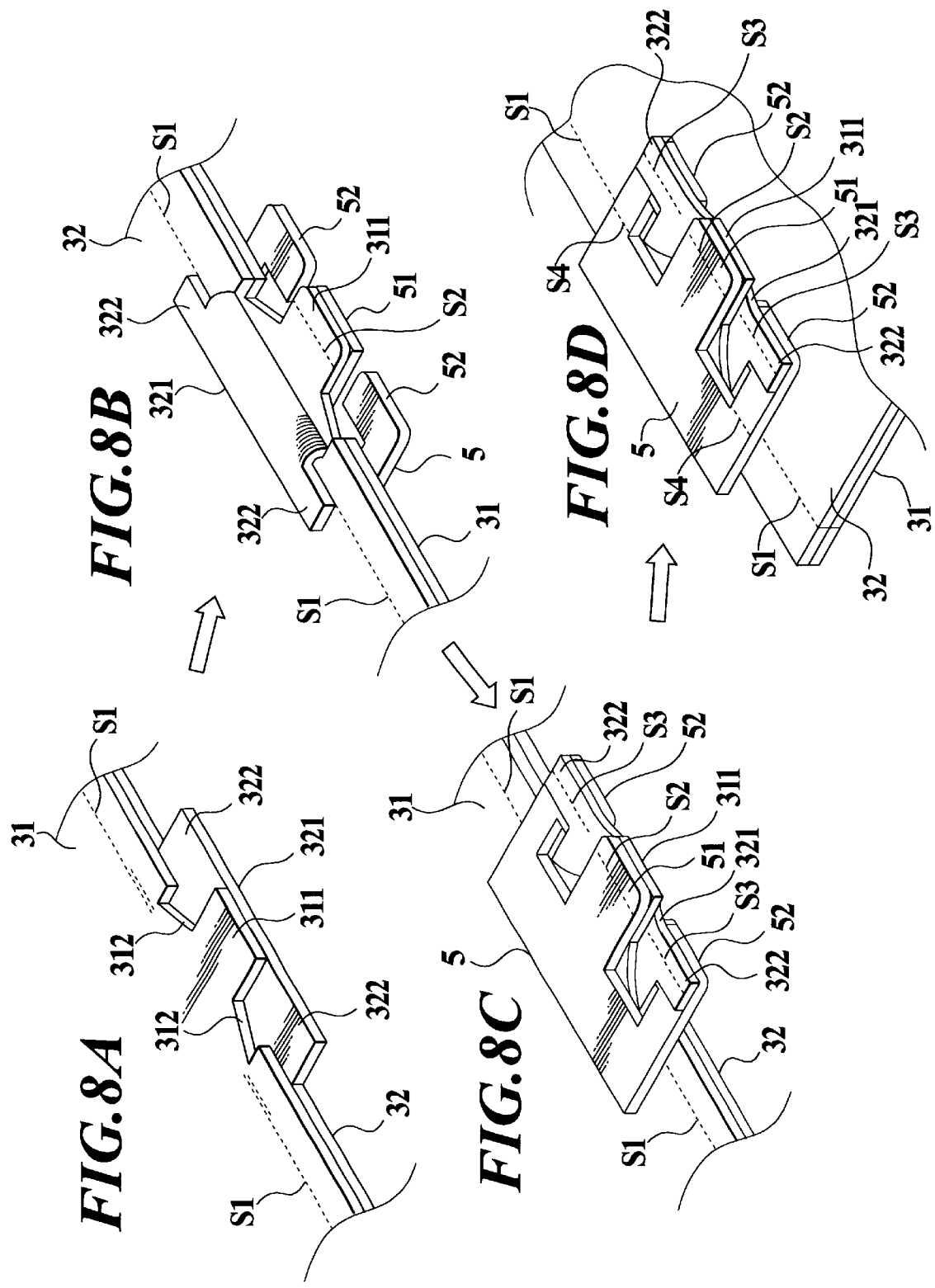

VEHICLE SEAT

BACKGROUND OF THE INVENTION

1. Field of the Invention

The present invention relates to a vehicle seat adapted for mounting of a child seat.

2. Description of Related Art

A vehicle seat that is an ISO FIX type of a child seat fixing system of an ISO (International Organization for Standardization) standard has been known. The ISO FIX type seat is provided with ISO FIX bars at a rear of a seat cushion, as anchorage members, into which base edges of a child seat are inserted to secure the child seat. The child seat includes a baby seat. Examples of the ISO FIX type seat have been disclosed by U.S. Pat. No. 5,941,601.

FIGS. 15A and 15B show the first earlier example of a seat cushion having ISO FIX bars. As shown in FIG. 15A, a seat cushion 100 is provided with a pair of ISO FIX bars 111 at a rear of the seat cushion 100. Both edges of the ISO FIX bars 111 are attached to a cross pipe of a seat frame by welding, which are not shown. The ISO FIX bars 111 are disposed in recess portions of a seat pad, respectively. For the ISO FIX bars 111, as enlarged shown in FIG. 15B, bag-like portions 102 for hiding rags are attached to a covering member 101.

FIGS. 16A and 16B show the second earlier example of a seat cushion having ISO FIX bars. As shown in FIG. 16A, a pair of right and left ISO FIX bars 211 are provided at a rear of a seat cushion 200 and, as enlarged shown in FIG. 16B, positioned in recess portions 222 of a seat pad 221. The ISO FIX bars 211 are positioned at slit portions 203 which are provided to a covering member 201.

On a backside of the slit portion 203 of the covering member 201, the first board 204 and second board 205, which are made of resin, are integrally sewn. The first board 204 is inserted into the ISO FIX bar 211 from the rear side. The second board 205 has a slit portion 206 into which the ISO FIX bar 211 is inserted.

However, with the first earlier example, as shown in FIGS. 15A and 15B, the ISO FIX bars 111 expose or project largely on the seat cushion 100. Therefore, fingers or objects, such as dust or trash, are easily inserted in a spacing of the ISO FIX bars 111 or the bag-like portions 102.

As for the second earlier example, as shown in FIGS. 16A and 16B, exposure of the ISO FIX bars 211 on the seat cushion 200 is small to prevent the insertion of the fingers in the spacing of the ISO FIX bars 211. Further, peripheries of the slit portion 203 of the covering member 201, where the ISO FIX bar 211 is placed, are sewn together with the first board 204 on the backside. Thus, the peripheries of the slit portion 203 of the covering member 201 hardly wrinkle or loosen.

However, seams or stitches by a sewing machine are visible on both sides of the slit portion 203 of the covering member 201. In addition, parts of the second board 205 (peripheries of the slit portion 206) are visible between the slit portion 203. Further, two boards, such as the first and second board 204 and 205, are required.

SUMMARY OF THE INVENTION

The present invention was developed in view of the above-described problems. Therefore, an object of the present invention is to provide vehicle seats that have ISO FIX bars for fixing a child seat on a seat cushion, that reduce exposure of the ISO FIX bars on the seat cushion to prevent insertion of fingers or dust in a spacing of the ISO FIX bars or in the seat cushion, and that have good appearances.

In order to accomplish the above-described object, in one aspect of the present invention, a vehicle seat comprises: a seat; an ISO FIX bar for securing a child seat to the seat, the ISO FIX bar being provided with a spacing in a center of the ISO FIX bar; and a covering member for covering the seat. The covering member has a slit portion for the ISO FIX bar to be exposed to a vehicle room. The covering member has an extending portion extending from one side of the slit portion. The vehicle seat also comprises an elastic board having a flat shape and an inserting portion which is inserted in the spacing of the ISO FIX bar. The elastic board is attached to a backside of a periphery of the slit portion of the covering member. With the vehicle seat, the extending portion of the covering member is attached on an upper surface of the inserting portion of the elastic board. The upper surface faces a side of the vehicle room. The inserting portion of the elastic board is inserted in the spacing of the ISO FIX bar, so that the ISO FIX bar is positioned at the slit portion of the covering member.

According to the vehicle seat, the inserting portion of the elastic board, which is attached to a backside of a periphery of the slit portion of the covering member, is inserted in the spacing of the ISO FIX bar on the seat. Thereby the ISO FIX bar is positioned at the slit portion of the covering member. The inserting portion of the elastic board is positioned at the slit portion of the covering member, thereby it is possible to reduce the exposure of the ISO FIX bars to prevent insertion of fingers or dust in the spacing of the ISO FIX bar or in the seat from the slit portion.

The extending portion extending from one side of the slit portion of the covering member is attached on the upper surface of the inserting portion of the elastic board crossing the slit portion of the covering member. Thereby the inserting portion of the elastic board does not expose to the slit portion of the covering member.

Further, only one elastic board is enough to hardly occur wrinkles or looseness at the peripheries of the slit portion of the covering member and to have good appearances.

With the vehicle seat, the elastic board may have both (opposite) side portions at outer edges of the elastic board or at both (opposite) sides of the inserting portion.

With the vehicle seat, an extending portion extending from another side of the slit portion of the covering member may be attached on lower surfaces of the both side portions of the elastic board.

According to the vehicle seat, because the extending portion extending from another side of the slit portion of the covering member may be attached on the lower surfaces of the both side portions of the elastic board, the both side portions of the elastic board may not expose to the slit portion of the covering member.

With the vehicle seat, the covering member may have first and second covering portions. The first covering portion may have a narrow extending portion extending from a center of the slit portion. The second covering portion may have a wide extending portion extending from the slit portion. The wide extending portion may have a length that is longer than a length of the slit portion. The first and second covering portions may be sewn together along an extended line from the slit portion. The narrow extending portion may be sewn on the upper surface of the inserting portion of the elastic board, while the wide extending portion may be sewn on the lower surfaces of the both side portions of the elastic boards.

According to the vehicle seat, on backsides of the first covering portion and second covering portion, which are sewn together along the extended line from the slit portion, the narrow extending portion of the first covering portion at the center of the slit portion may be sewn on the upper surface of the inserting portion of the elastic board. On the other hand, the wide extending portion reaching over the slit portion of the second covering portion may be sewn on the lower surfaces of both side portions of the elastic boards. Thereby seams or stitches by a sewing machine may not be visible on the slit portion of the covering member, where the ISO FIX bar is positioned.

In accordance with another aspect of the present invention, a vehicle seat comprises: a seat; an ISO FIX bar for securing a child seat to the seat, the ISO FIX bar being provided with a spacing in a center of the ISO FIX bar; a covering member for covering the seat. The covering member has a slit portion for the ISO FIX bar to be exposed to a vehicle room. The covering member has extending portions extending from both sides of the slit portion. The vehicle seat also comprises an elastic board having a flat shape and an inserting portion to be inserted in the spacing of the ISO FIX bar. The elastic board is attached to a backside of a periphery of the slit portion of the covering member. A spacing is formed in the elastic board, and the inserting portion adjoins the spacing. The extending portions of the covering member are inserted into the spacing of the elastic board, and then turned back to be attached to a backside of the elastic board. The inserting portion covered with the extending portions of the covering member is inserted in the spacing of the ISO FIX bar, so that the ISO FIX bar is positioned at the slit portion of the covering member.

According to the vehicle seat, the inserting portion adjoining the spacing of the elastic board, which is attached to a backside of a periphery of the slit portion of the covering member, is inserted in the spacing of the ISO FIX bar on the seat. Thereby the ISO FIX bar is positioned at the slit portion of the covering member. The inserting portion of the elastic board is positioned at the slit portion of the covering member, thus it is possible to reduce the exposure of the ISO FIX bar to prevent insertion of fingers or dust in the spacing of the ISO FIX bar or in the seat from the slit portion.

The inserting portion of the elastic board crossing the slit portion of the covering member is covered with the extending portion of both sides of the slit portion of the covering member, thereby the inserting portion of the elastic board does not expose to the slit portion of the covering member.

Further, only one elastic board is enough to hardly occur wrinkles or looseness at the peripheries of the slit portion of the covering member, and to have good appearances.

BRIEF DESCRIPTION OF THE DRAWINGS

The above and other objects, features and advantages of the invention will become more apparent from the following description taken in conjunction with the accompanying drawings wherein like references refer to like parts and wherein:

FIGS. 1A and 1B show a seat cushion having ISO FIX bars according to the first embodiment of the present invention; wherein FIG. 1A is a schematically perspective view of the seat cushion, and FIG. 1B is a schematically and enlarged perspective view of a periphery of an ISO FIX bar, showing that a seat pad is covered with a covering member;

FIGS. 8A to 8D are perspective views showing sewing steps of the covering member and board in order;

FIGS. 9A and 9B show a seat cushion having ISO FIX bars according to the second embodiment of the present invention; wherein FIG. 9A is a schematically perspective view of the seat cushion, and FIG. 9B is a schematically and enlarged perspective view of a periphery of an ISO FIX bar, showing that a seat pad is covered with a covering member;

FIGS. 15A and 15B show a seat cushion having ISO FIX bars according to the first earlier example; wherein FIG. 15A is a schematically perspective view of the seat cushion, and FIG. 15B is an enlarged view of a periphery of the ISO FIX bar; and FIGS. 16A and 16B show a seat cushion having ISO FIX bars according to the second earlier example; wherein FIG. 16A is a schematically perspective view of the seat cushion, and FIG. 16B is a schematically and enlarged perspective view of a periphery of an ISO FIX bar, showing that a seat pad is covered with a covering member.

PREFERRED EMBODIMENT OF THE INVENTION

Embodiments of vehicle seats in accordance with the present invention will be explained with reference to drawings.

FIRST EMBODIMENT

Figure 1A:
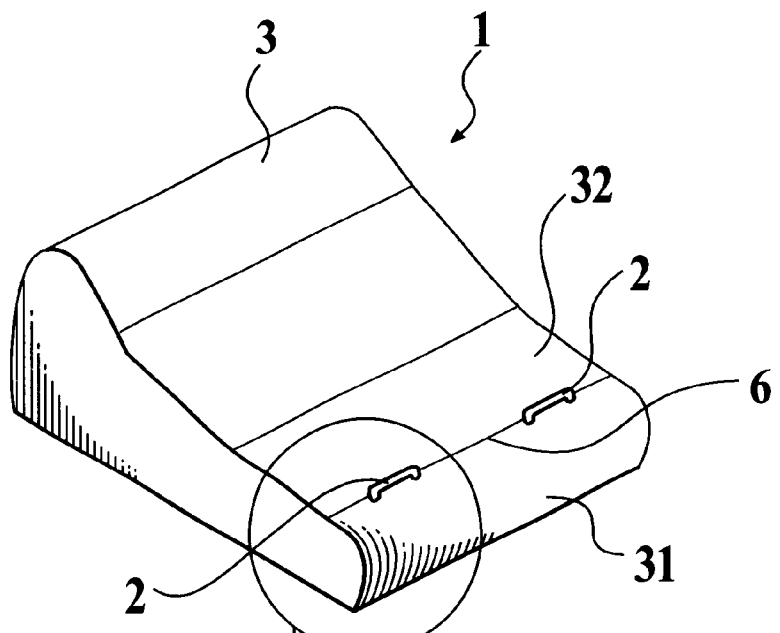
Figure 1B:
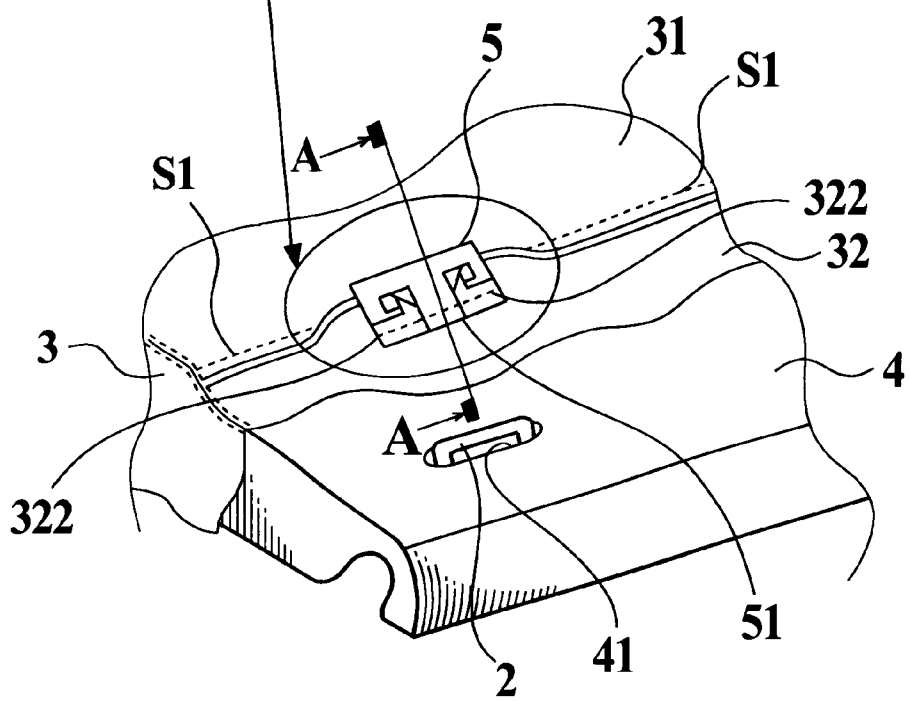

With the first embodiment, as shown in FIG. 1A, a pair of ISO FIX bars 2 are provided on right and left of rear portions of a seat cushion 1 and placed at a sewing portion 6 (sewing line: see stitches S1) between the first covering member (first covering portion) 31 and second covering member (second covering portion) 32 numbered from a rear side of a covering member 3. The covering member 3 includes the first and second covering members 31 and 32. As enlarged shown in FIG. 1B, the ISO FIX bar 2 is disposed in a recess portion 41 of a seat pad 4 made of a cushion material like urethane and has a spacing in a center of the ISO FIX bar 2. In FIG. 1B, the first and second covering members 31 and 32 are turned over.

At the sewing portion 6 between the first covering member 31 and second covering member 32, slit portions 7 (see FIGS. 2 and 4) that are not sewn, corresponding to the ISO FIX bars 2, are provided on right and left of the sewing portion 6. An elastic board 5 made of resin, for example, polypropylene (PP), is integrally sewn on a backside of the slit portion 7, respectively. The elastic board 5 is about flat.

Figure 6:
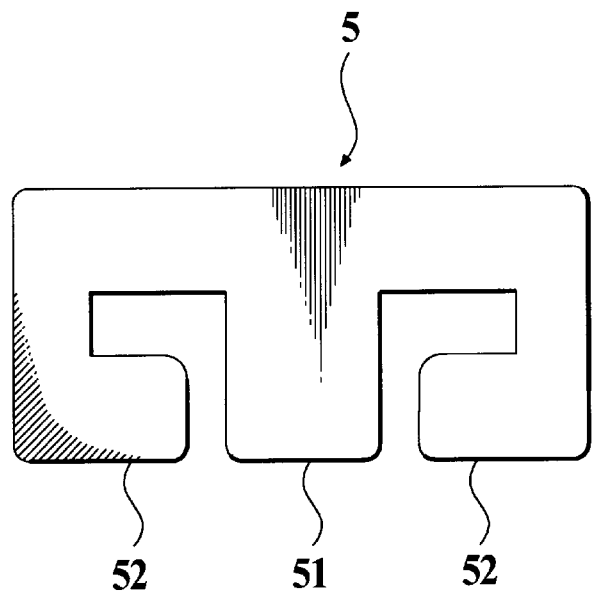
FIG. 6 is a plan view of a board.

As shown in FIG. 6, the elastic board 5 has a contour having an approximately rectangular shape, an inserting portion 51 at a center of the board 5 which is inserted in or through the spacing of the ISO FIX bar 2. The elastic board 5 also has both side portions 52 which are on opposite sides of the inserting portion 51 and which have a shape surrounding the inserting portion 51.

Figure 7A:
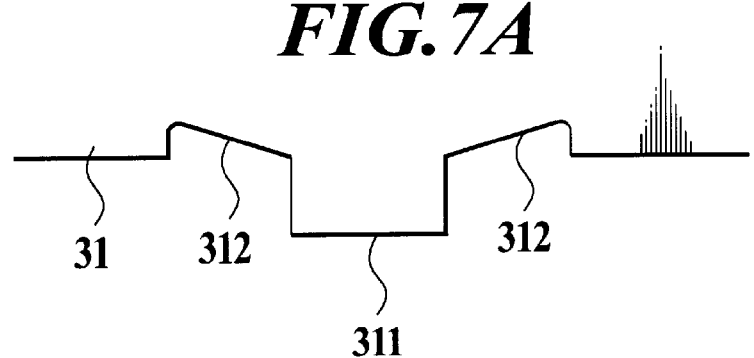
FIG. 7A is a plan view of a board attaching portion of one covering member.

As shown in FIG. 7A, the first covering member 31 has, at a position corresponding to the slit portion 7, a narrow extending portion 311, and cut-out shaped portions 312 on opposite sides of the narrow extending portion 311. The narrow extending portion 311 is positioned at a center of the slit portion 7. The cut-out shaped portions 312 are corresponding to respective ends of the slit portion 7.

Figure 7B:
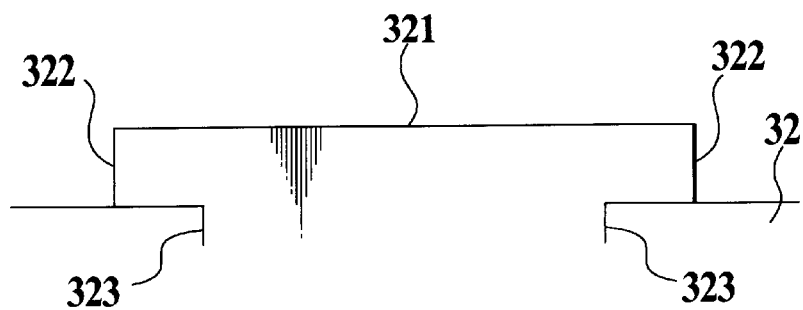
FIG. 7B is a plan view of a board attaching portion of the other covering member.

As shown in FIG. 7B, the second covering member 32 has, at a position corresponding to the slit portion 7, a wide extending portion 321. Cut portions 323 are provided from both end portions 322 of the wide extending portion 321. The wide extending portion 321 is wider than a length of the slit portion 7, thereby the both end portions 322 and cut portions 323 are positioned at outsides of the slit portion 7.

The elastic board 5, the first covering member 31 and second covering member 32 are sewn together as shown in FIGS. 8A to 8D.

At first, as shown in FIG. 8A, room side surfaces of the first covering member 31 and second covering member 32 are overlapped to be facing each other, and then sewn by a sewing machine which is not shown (see stitches S1). An overlapping portion between the narrow extending portion 311 and the wide extending portion 321 is not sewn so that the slit portion 7 will be provided.

Next, as shown in FIG. 8B, the elastic board 5 is layered on a back surface side of the first covering member 31. The wide extending portion 321 of the second covering member 32 is turned back. Then the inserting portion 51 of the elastic board 5 and the narrow extending portion 311, which is overlapped with the inserting portion 51, are sewn together (see stitches S2).

Thereafter, as shown in FIG. 8C, both end portions 322 of the wide extending portion 321 of the second covering member 32 are overlapped with an opposite surface (lower surface) of both side portions 52 of the elastic board 5, and then sewn together (see stitches S3). The opposite surface (lower surface) of both side portions 52 means that it is opposite of the upper surface of the inserting portion 51 on which the narrow extending portion 311 is overlapped.

Then, as shown in FIG. 8D, both covering members 31 and 32 are turned back to an opposite side. Thereafter both side portions 52 of the elastic board 5 and both covering members 31 and 32 are finally sewn together along an outside of the stitches S1 (see stitches S4).

Figure 2:
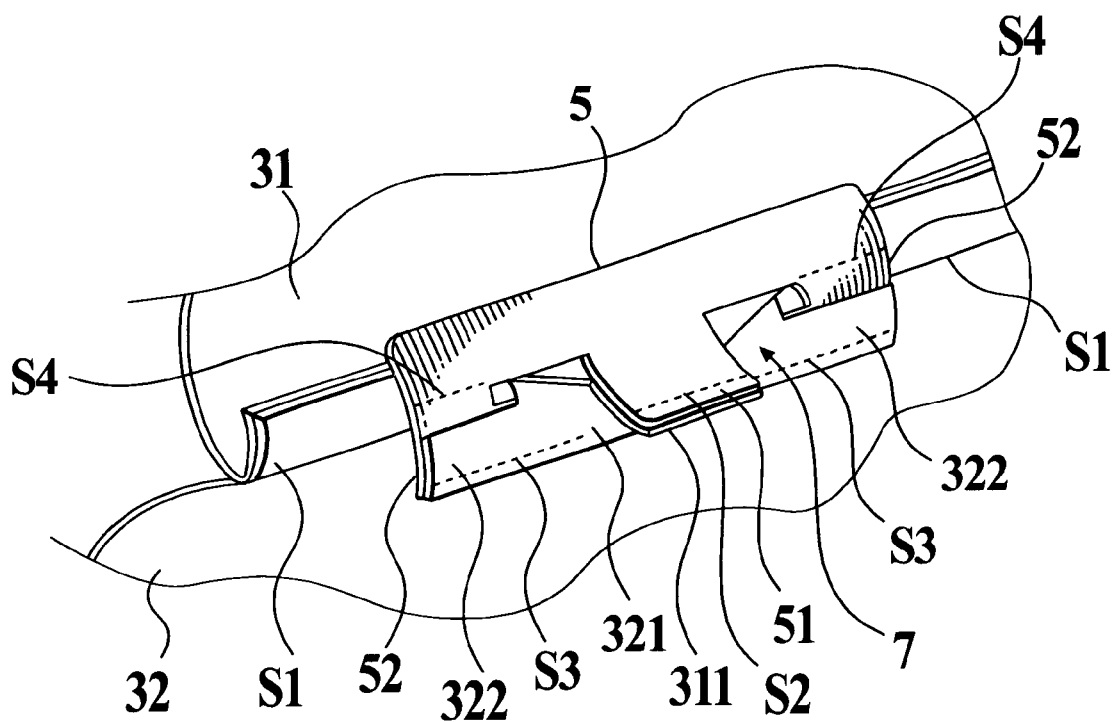
FIG. 2 is an enlarged view of a board attached to the cover member of FIG. 1B.
Figure 3:
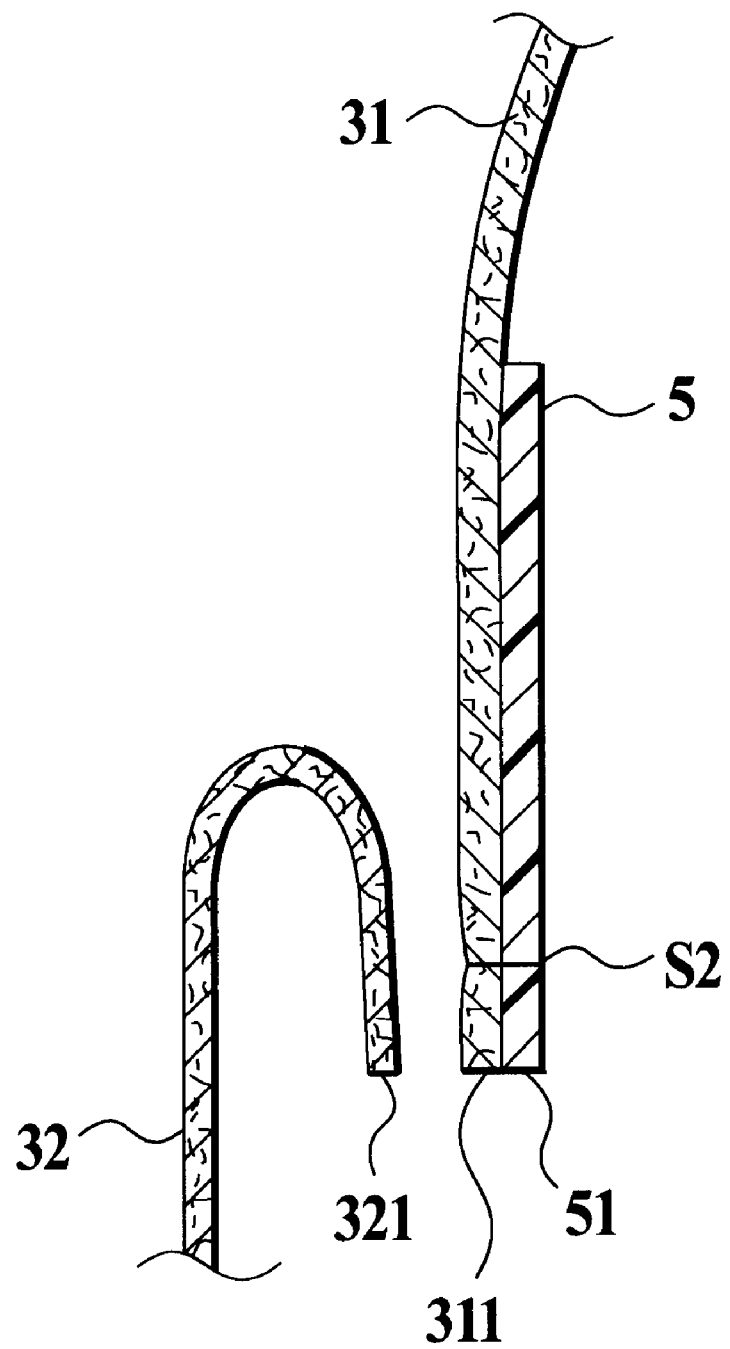
FIG. 3 is a cross section taken along the line A—A of FIG. 1B looking in the direction of the arrows.

After the sewing is finished, the first covering member 31 is spread against the second covering member 32. Thus, as shown in FIG. 2, the slit portion 7 is provided between the narrow extending portion 311 of the first covering member 31 and the wide extending portion 321 of the second covering member 32.

For covering the seat pad 4 with the covering member 3, at first, as shown in FIG. 1B, the inserting portion 51 of the elastic board 5 is inserted from the rear side in the ISO FIX bar 2 on the seat pad 4. Then, the ISO FIX bar 2 is inserted in the slit portion 7 (see FIG. 2) between the narrow extending portion 311 of the first covering member 31 and the wide extending portion 321 of the second covering member 32.

Figure 4:
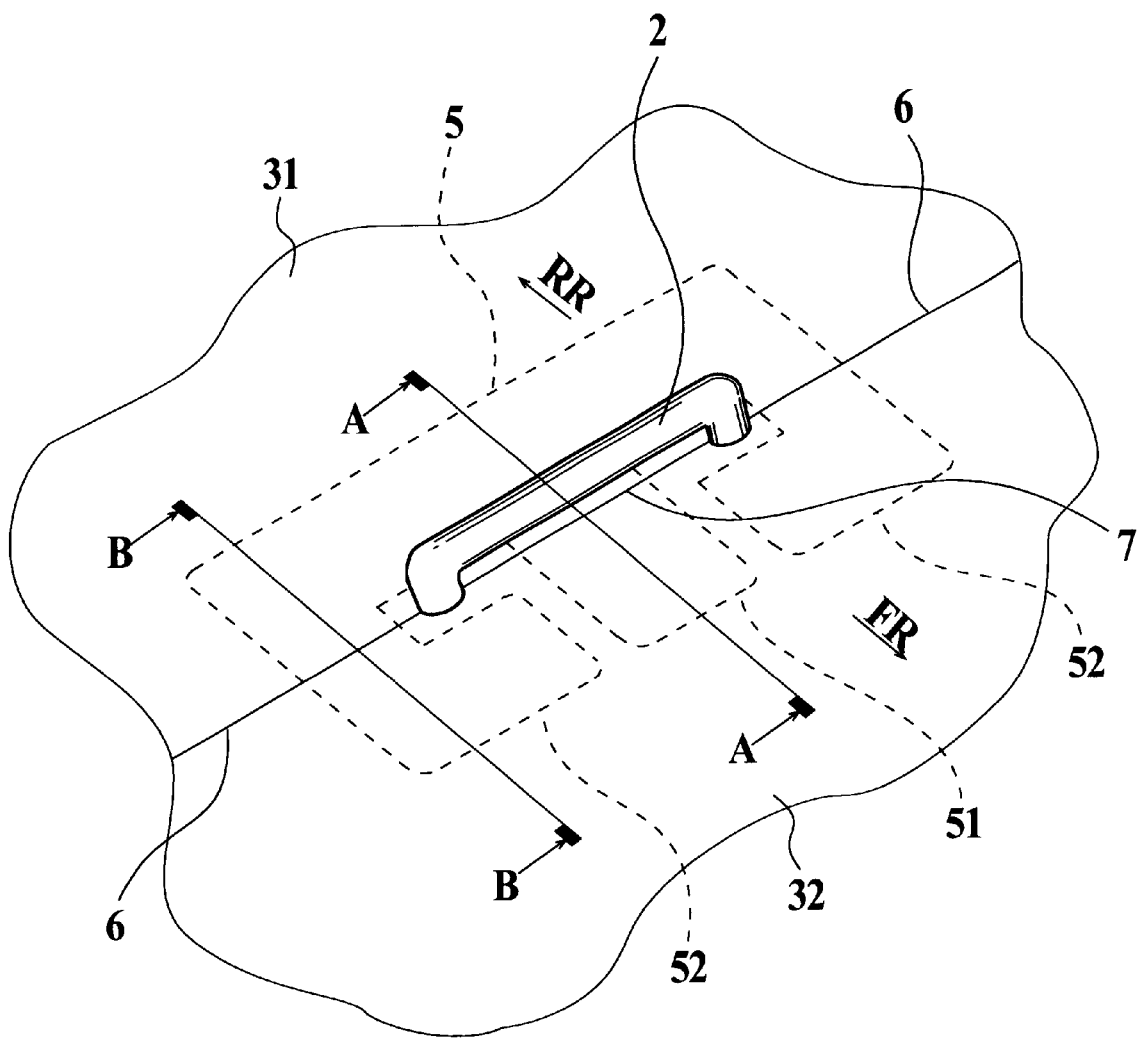
FIG. 4 is an enlarged view of a periphery of the ISO FIX bar of FIG. 1A, according to the first embodiment of the present invention.
Figure 5A:
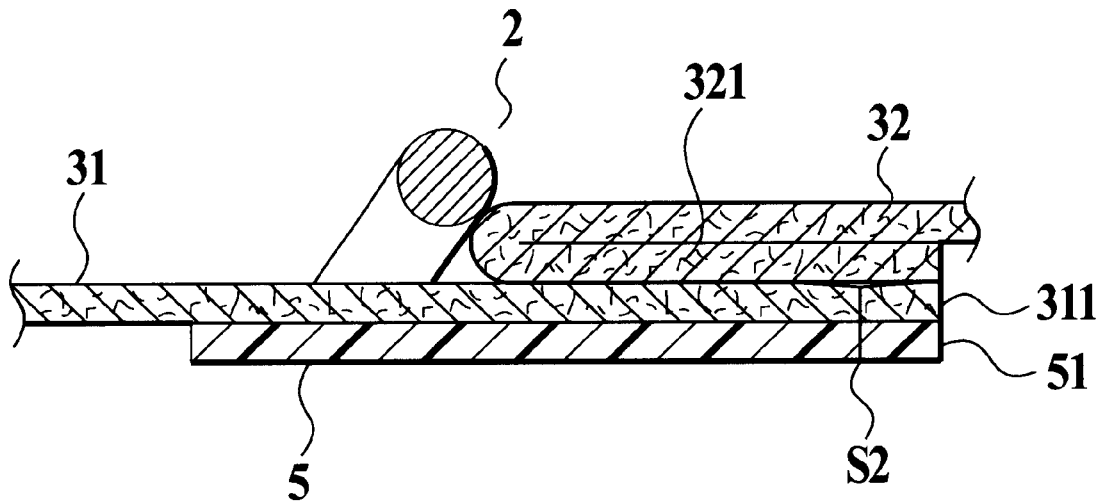
FIG. 5A is a cross section taken along the line A—A of FIG. 4 looking in the direction of the arrows.
Figure 5B:
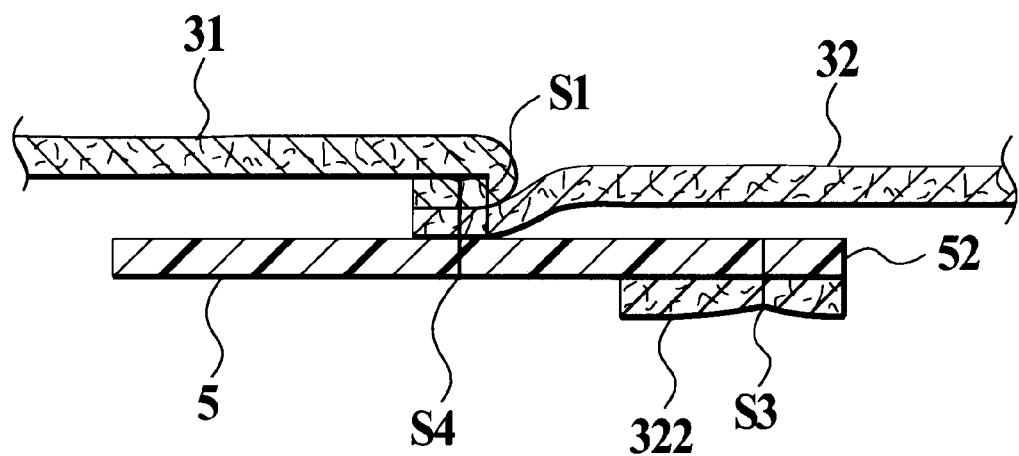
FIG. 5B is a cross section taken along the line B—B of FIG. 4 looking in the direction of the arrows.

The periphery of the ISO FIX bar 2 on the seat cushion 1 at this time is shown in FIG. 4. At a portion corresponding to the ISO FIX bar 2, as shown in FIGS. 3 to 5A, the wide extending portion 321 of the second covering member 32 is turned back to the inside, and then layered on the first covering member 31. At portions corresponding to both side portions of the ISO FIX bar 2, as shown in FIG. 5B, the first covering member 31 and second covering member 32 are turned back along the sewing portion 6 to be overlapped with the elastic board 5.

According to the structures of the peripheries of the ISO FIX bar 2, the following advantages or effects are obtained.

(1) The inserting portion 51 of the elastic board 5 is positioned at the slit portion 7 provided at the sewing portion 6 between the first and second covering members 31 and 32. Thereby the exposure or projection of the ISO FIX bar 2 is small, so that the insertion of fingers or dust in the spacing of the ISO FIX bar 2 or in the recess portion 41 from the slit portion 7 can be prevented.

(2) The extending portion 311 of the first covering member 31 is attached on the upper surface of the inserting portion 51 of the elastic board 5 crossing the slit portion 7, thereby the inserting portion 51 and both side portions 52 do not expose to the slit portion 7 of the covering member 3.

(3) The backside of the slit portion 7 of the covering member 3 is lined by the elastic board 5, thereby the possibility of occurrence of wrinkles or looseness at the peripheries of the slit portion 7 of the covering member 3 is small.

(4) Only single elastic board 5 is required.

(5) The stitches are not visible at the slit portion 7 of the covering member 3.

(6) Therefore, the vehicle seat has a beautiful appearance.

SECOND EMBODIMENT

Figure 9A:
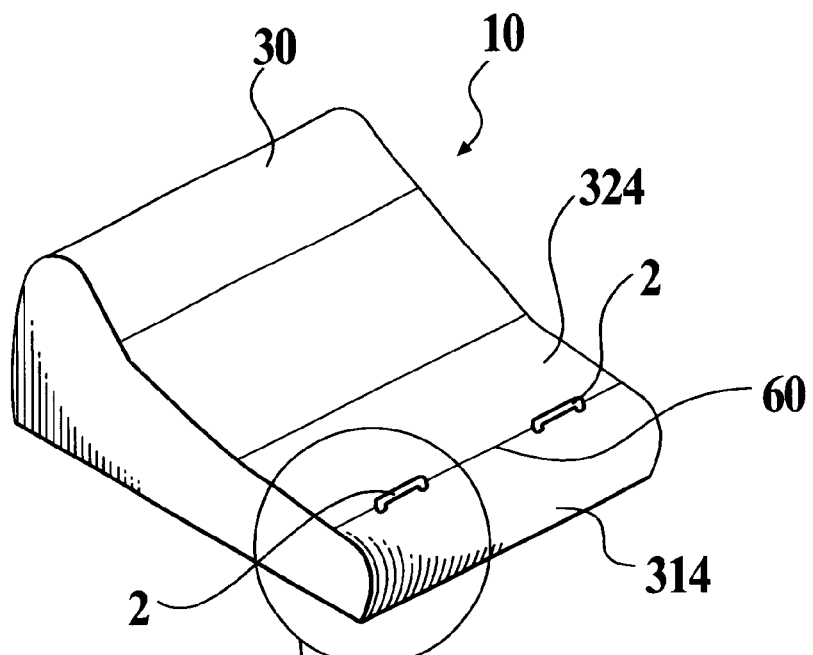
Figure 9B:
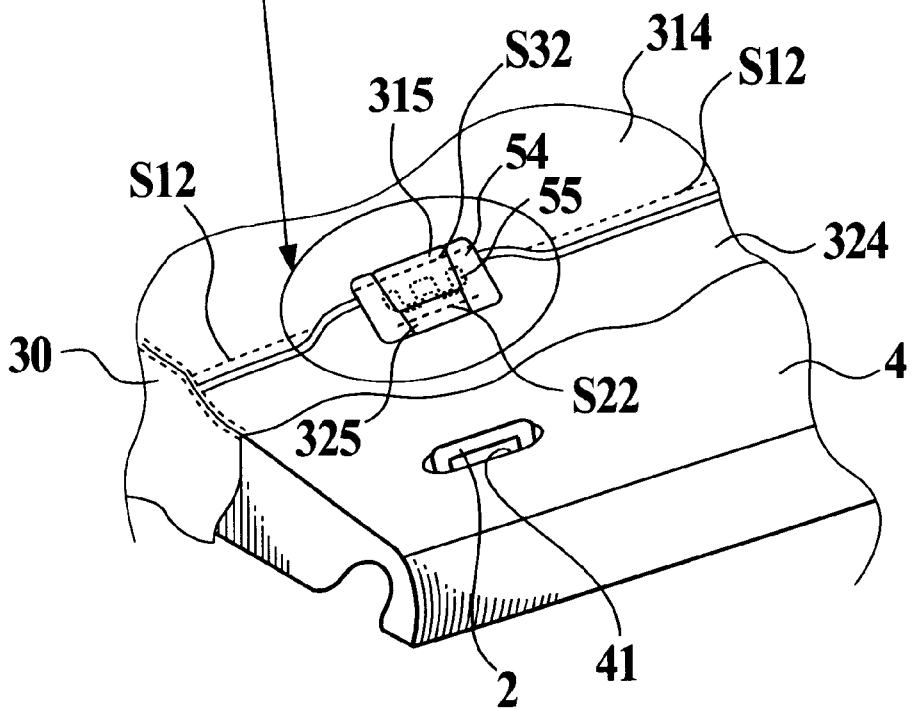

The second embodiment will be explained. With the second embodiment, as shown in FIG. 9A, the pair of ISO FIX bars 2 described as in the first embodiment are provided on rear portions of a seat cushion 10 and placed at a sewing portion 60 (sewing line: see stitches S12) between the first covering member 314 and second covering member 324 numbered from a rear side of a covering member 30. The covering member 30 includes the first and second covering members 314 and 324. In FIG. 9B, the first and second covering members 314 and 324 are turned over.

At the sewing portion 60 between the first covering member 314 and second covering member 324, two slit portions 70 (see FIG. 10), which are not sewn, are provided along the sewing portion 60, corresponding to the ISO FIX bars 2.

With the second embodiment, an elastic board 54 is made of PP and approximately flat and has a thickness of 1.5mm.

Figure 12:
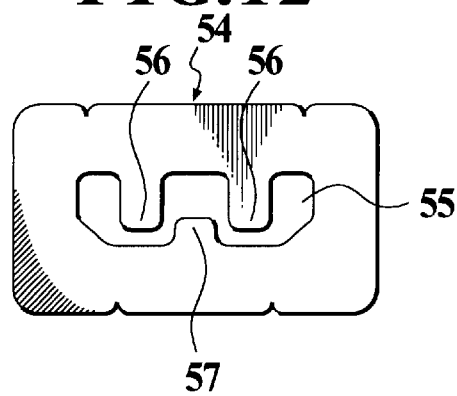
FIG. 12 is a plan view of a board.

As shown in FIG. 12, the elastic board 54 has a contour having an approximately rectangular shape, a pair of projecting portions 56 and 56 in a spacing 55 formed at a center of the board 54, and a projecting portion 57 positioned between the projecting portions 56 and 56. The projecting portions 56 and 56 are for inserting in the spacing of the ISO FIX bar 2. The elastic board 54 is integrally sewn on a backside of the slit portion 70, respectively.

Figure 13A:
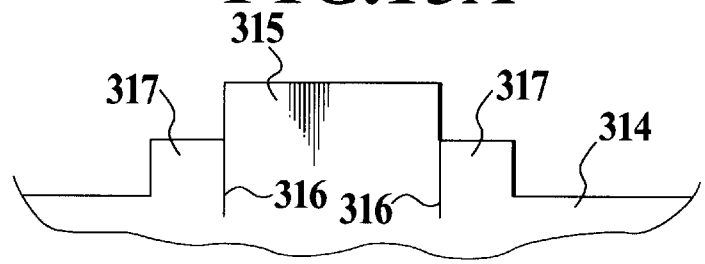
FIG. 13A is a plan view of a board attaching portion of one covering member.

As shown in FIG. 13A, at a portion corresponding to the slit portion 70, the first covering member 314 has a central extending portion 315 and short side extending portions 317 and 317 on opposite sides of the central extending portion 315. The side extending portions 317 and 317 are separated from the central extending portion 315 by cut portions 316 and 316.

Figure 13B:
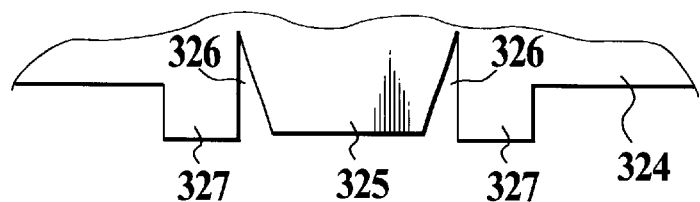
FIG. 13B is a plan view of a board attaching portion of the other covering member.

As shown in FIG. 13B, the second covering member 324 has, at a portion corresponding to the slit portion 70, a central extending portion 325 and side extending portions 327 and 327 on opposite sides of the central extending portion 325. The side extending portions 327 and 327 are separated from the central extending portion 325 by notch portions 326 and 326 and have the same length as that of the central extending portion 325.

The elastic board 54, the first covering member 314 and the second covering member 324 are sewn together as shown in FIGS. 14A to 14D.

Figure 14A:
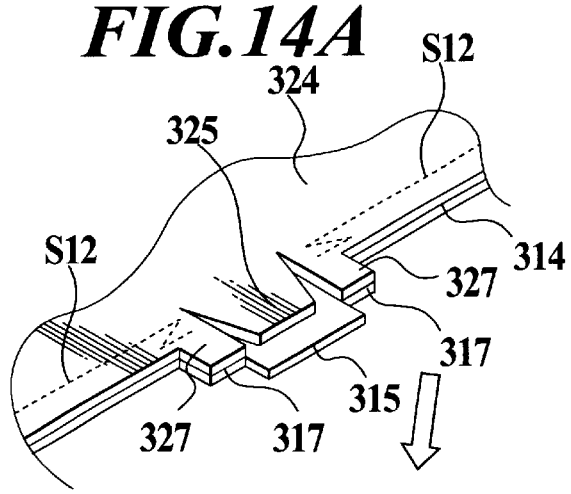
FIGS. 14A to 14D are perspective views showing sewing steps of the covering member and board in order.

At first, as shown in FIG. 14A, room side surfaces of the first covering member 314 and the second covering member 324 are overlapped to be facing each other, and then sewn by a sewing machine which is not shown (see stitches S12). An overlapping portion of the central extending portions 315 and 325 is not sewn so that the slit portion 70 will be provided.

Figure 14B:
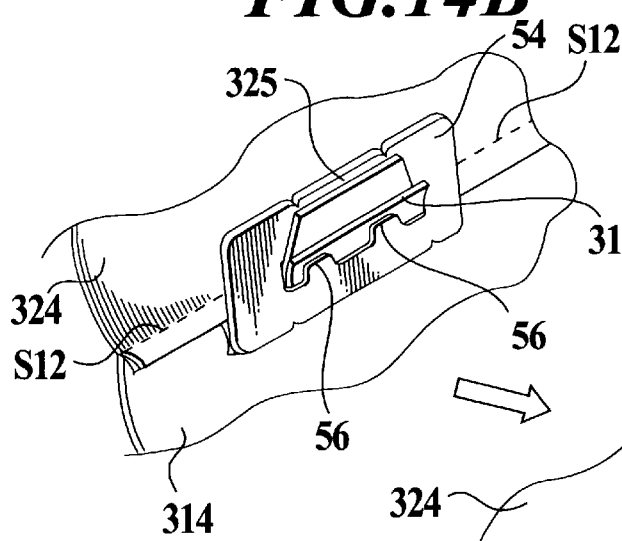

Next, as shown in FIG. 14B, the overlapped central extending portions 315 and 325 are inserted in the spacing 55 of the elastic board 54. The central extending portion 315 of the first covering member 314 faces the pair of projecting portions 56 and 56, while the central extending portion 325 of the second covering member 324 faces the projecting portion 57.

Figure 14C:
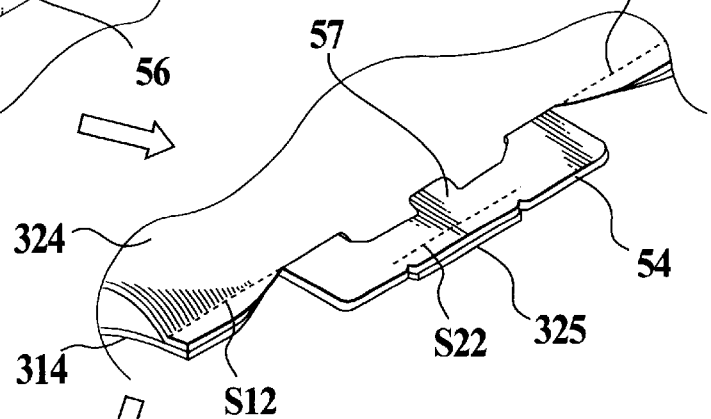

Thereafter, as shown in FIG. 14C, the elastic board 54 is moved so as to be separated from the second covering member 324. Then, the central extending portion 325 of the second covering member 324 is overlapped with the elastic board 54, and then sewn together (see stitches S22).

Figure 14D:
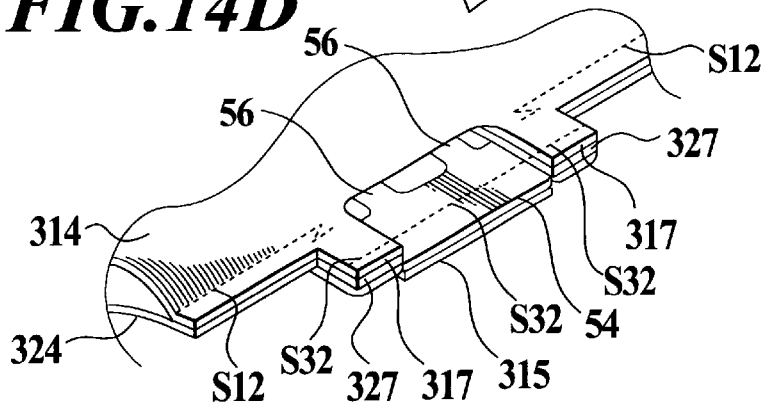
Figure 15A:
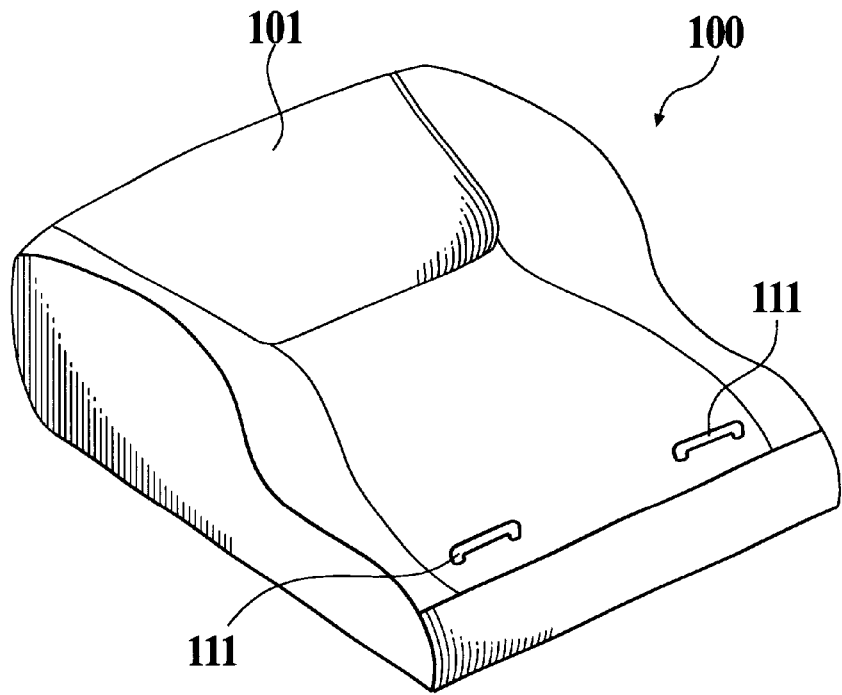
Figure 15B:
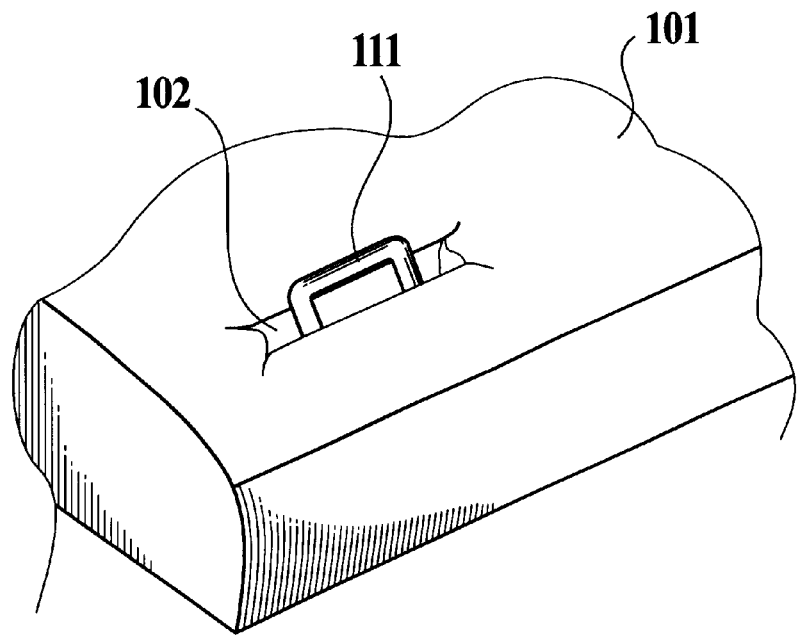
Figure 16A:
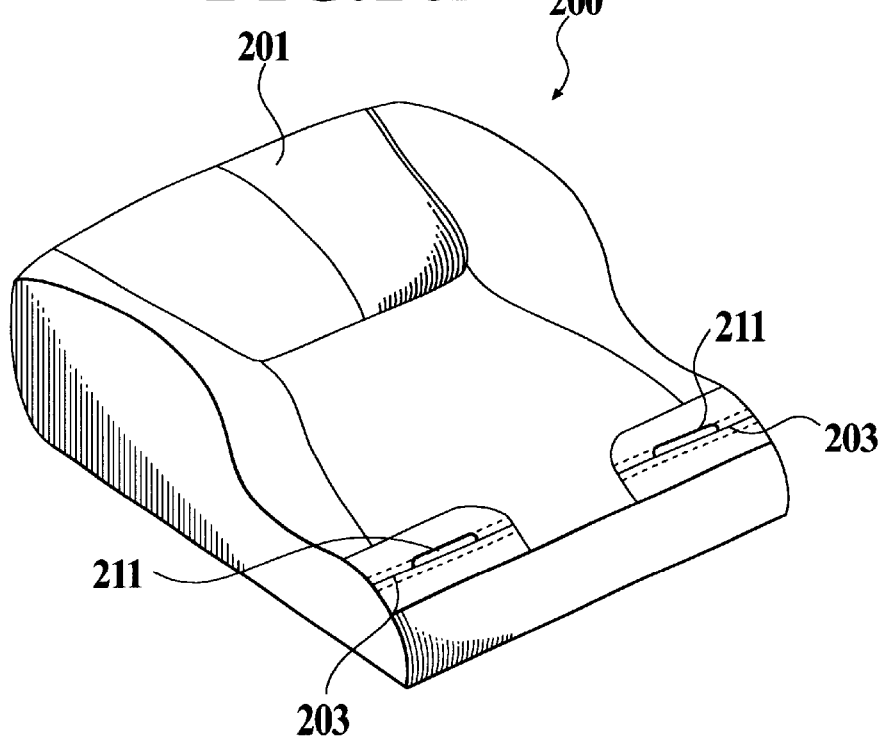
Figure 16B:
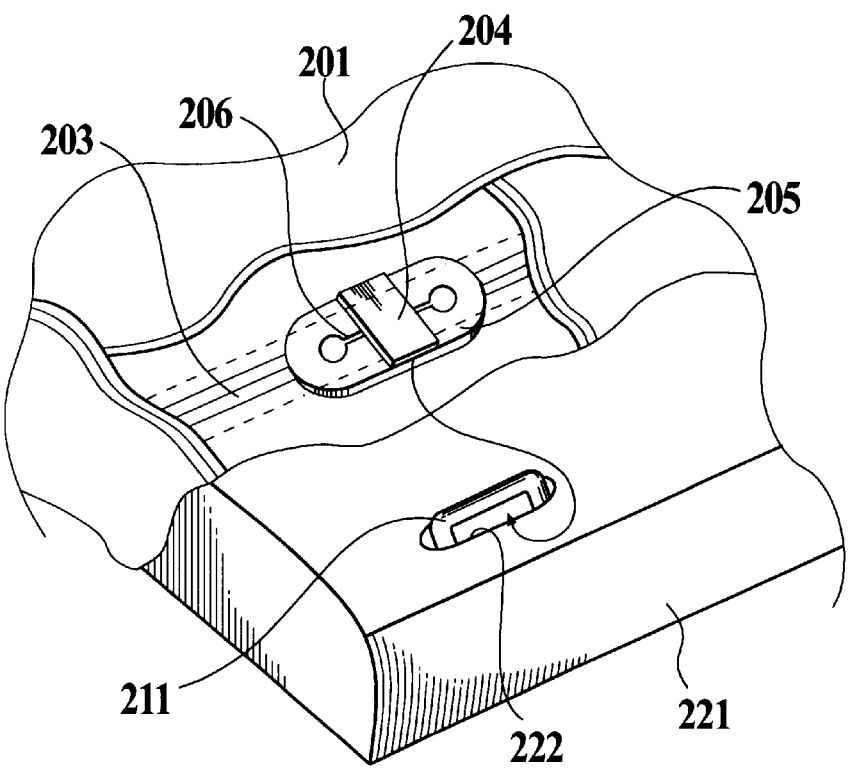

As shown in FIG. 14D, the elastic board 54 is overlapped with the second covering member 324, thereafter the whole is turned upside down, so that the first covering member 314 is in an upside. Thereby, the central extending portion 315 of the first covering member 314 is overlapped with a lower surface of the elastic board 54, while the side extending portions 317 and 317 of the first covering member 314 and side extending portions 327 and 327 of the second covering member 324 are overlapped with an upper surface of the elastic board 54.

In this state, the central extending portion 315, the side extending portions 317 and 317 of the first covering member 314, and the side extending portions 327 and 327 of the second covering member 324 are finally sewn on the elastic board 54 (see stitches S32).

After the sewing above-described, the slit portion 70 is provided between the central extending portions 315 and 325 of both covering members 314 and 324.

For covering the seat pad 4 with the covering member 30, at first, the spacing 55 of the elastic board 54 is fitted from an upper side through the ISO FIX bar 2 on the seat pad 4 (see FIG. 9B), so that the projecting portions 56, 56 and 57 of the elastic board 54 are inserted in the spacing of the ISO FIX bar 2. The projecting portions 56, 56 and 57 are covered with the central extending portions 315 and 325 of the covering members 314 and 324. Then, the ISO FIX bar 2 is inserted in the slit portion 70 between the central extending portions 315 and 325 of the covering members 314 and 324.

Figure 10:
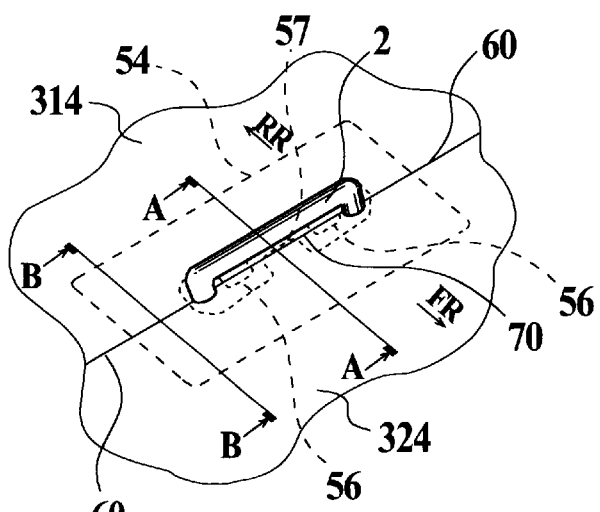
FIG. 10 is an enlarged view of a periphery of the ISO FIX bar of FIG. 9A, according to the second embodiment of the present invention.
Figure 11A:
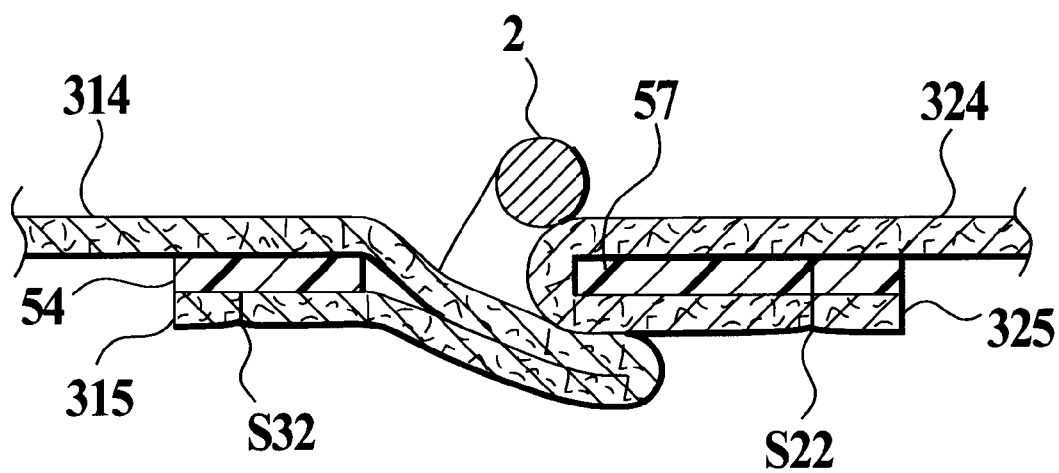
FIG. 11A is a cross section taken along the line A—A of FIG. 10 looking in the direction of the arrows.
Figure 11B:
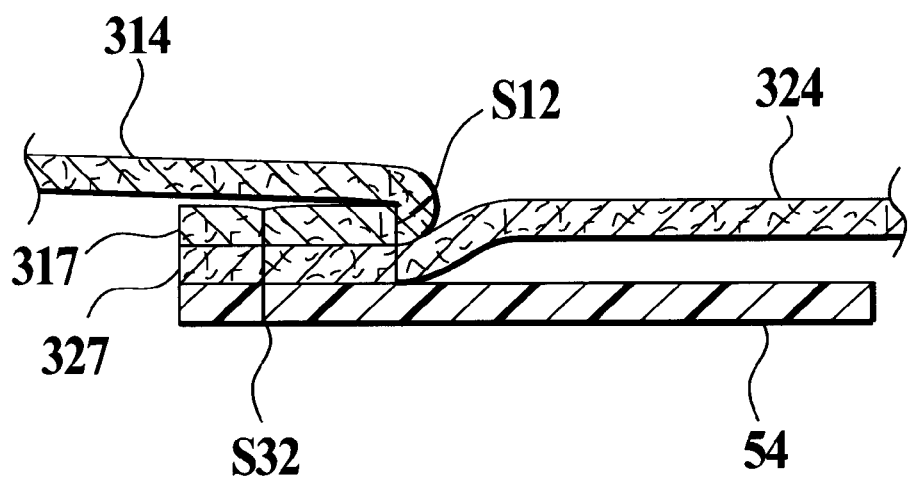
FIG. 11B is a cross section taken along the line B—B of FIG. 10 looking in the direction of the arrows.

The peripheries of the ISO FIX bar 2 of the seat cushion 10 at this time are shown in FIG. 10 which is enlarged. At a portion corresponding to the ISO FIX bar 2, as shown in FIG. 11A, the central extending portion 325 of the second covering member 324 is turned back to the inside to be overlapped with the first covering member 314. At portions corresponding to both side portions of the ISO FIX bar 2, as shown in FIG. 11B, the first covering member 314 and second covering member 324 are turned back along the sewing portion 60 to be overlapped with the elastic board 54.

According to the structures of the peripheries of the ISO FIX bar 2, the following advantages or effects are obtained.

(1) The projecting portions 56, 56 and 57 of the elastic board 54 are positioned at the slit portion 70 provided at the sewing portion 60 between the first and second covering members 314 and 324. Thereby the exposure of the ISO FIX bar 2 is small, so that the insertion of fingers or dust in the spacing of the ISO FIX bar 2 or in the recess portion 41 from the slit portion 70 can be prevented.

(2) The central extending portions 315 and 325 of both covering members 314 and 324 are attached on the projecting portions 56, 56 and 57 at the spacing 55 of the elastic board 54 crossing the slit portion 70. Thereby the projecting portions 56, 56 and 57 of the elastic board 54 do not expose to the slit portion 70 of the covering member 30, where the ISO FIX bar 2 is positioned.

(3) The backside of the slit portion 70 of the covering member 30 is lined by the elastic board 54, thereby the possibility of occurrence of wrinkles or looseness at the peripheries of the slit portions 70 of the covering member 30 is small.

(4) Only single elastic board 54 is required.

(5) The stitches are not visible at the slit portion 70 of the covering member 30.

(6) Therefore, the vehicle seat has a beautiful appearance.

With the above-described embodiments, the elastic boards are made of PP. However, the present invention is not limited to PP. The elastic boards may be made of another resin.

From the foregoing description, one skilled in the art can easily ascertain the essential characteristics of this invention, and without departing from the spirit and scope thereof, can make various changes and modifications of the invention to adapt it to various usage and conditions.

The entire disclosure of Japanese Patent Application No. 2000-163059 filed on May 31, 2000 including specification, claims, drawings and summary are incorporated herein by reference in its entirety.

What is claimed is:

1. A vehicle seat comprising:

a seat;

an ISO FIX bar for securing a child seat to the seat, the ISO FIX bar being provided with a spacing in a center of the ISO FIX bar;

a covering member for covering the seat, the covering member having a slit portion for the ISO FIX bar to be exposed to a vehicle room, and the covering member having an extending portion extending from one side of the slit portion; and an elastic board having a flat shape and an inserting portion to be inserted in the spacing of the ISO FIX bar, the elastic board being attached to a backside of a periphery of the slit portion of the covering member;

wherein the extending portion of the covering member is attached on an upper surface of the inserting portion of the elastic board, the upper surface faces a side of the vehicle room, and the inserting portion of the elastic board is inserted in the spacing of the ISO FIX bar, so that the ISO FIX bar is positioned at the slit portion of the covering member.

2. The vehicle seat as claimed in claim 1, wherein the elastic board has both side portions at outer edges of the elastic board and at both sides of the inserting portion.

3. The vehicle seat as claimed in claim 2, wherein an extending portion extending from another side of the slit portion of the covering member is attached on lower surfaces of the both side portions of the elastic board.

4. The vehicle seat as claimed in claim 3, wherein the covering member has first and second covering portions, the first covering portion has a narrow extending portion extending from a center of the slit portion, the second covering portion has a wide extending portion extending from the slit portion, the wide extending portion having a length that is longer than a length of the slit portion, the first and second covering portions are sewn together along an extended line from the slit portion, the narrow extending portion is sewn on the upper surface of the inserting portion of the elastic board, and the wide extending portion is sewn on the lower surfaces of the both side portions of the elastic boards.

5. A vehicle seat comprising:

a seat;

an ISO FIX bar for securing a child seat to the seat, the ISO FIX bar being provided with a spacing in a center of the ISO FIX bar;

a covering member for covering the seat, the covering member having a slit portion for the ISO FIX bar to be exposed to a vehicle room, the covering member having extending portions extending from both sides of the slit portion: and an elastic board having a flat shape and an inserting portion to be inserted in the spacing of the ISO FIX bar, the elastic board being attached to a backside of a periphery of the slit portion of the covering member, wherein a spacing is formed in the elastic board, and the inserting portion adjoins the spacing;

wherein the extending portions of the covering member are inserted into the spacing of the elastic board to be turned back to be attached to a backside of the elastic board, and the inserting portion covered with the extending portions of the covering member is inserted in the spacing of the ISO FIX bar, so that the ISO FIX bar is positioned at the slit portion of the covering member.

* * * * *